US009396579B2

(12) United States Patent
Naske et al.

(10) Patent No.: US 9,396,579 B2
(45) Date of Patent: Jul. 19, 2016

(54) METHOD FOR VISUALIZING THREE-DIMENSIONAL IMAGES ON A 3D DISPLAY DEVICE AND 3D DISPLAY DEVICE

(76) Inventors: Ivo-Henning Naske, Kakenstorf (DE); Sigrid Kamins-Naske, Kakenstorf (DE); Valerie Antonia Naske, Kakenstorf (DE)

(*) Notice: Subject to any disclaimer, the term of this patent is extended or adjusted under 35 U.S.C. 154(b) by 432 days.

(21) Appl. No.: 13/580,909

(22) PCT Filed: Feb. 25, 2011

(86) PCT No.: PCT/DE2011/000187
§ 371 (c)(1),
(2), (4) Date: Nov. 30, 2012

(87) PCT Pub. No.: WO2011/103866
PCT Pub. Date: Sep. 1, 2011

(65) Prior Publication Data
US 2013/0147804 A1    Jun. 13, 2013

(30) Foreign Application Priority Data
Feb. 25, 2010    (DE) .......................... 10 2010 009 291

(51) Int. Cl.
G09G 5/00      (2006.01)
G06T 15/50     (2011.01)
H04N 13/00     (2006.01)
H04N 13/04     (2006.01)
G02B 27/22     (2006.01)

(52) U.S. Cl.
CPC ............... *G06T 15/50* (2013.01); *G02B 27/22* (2013.01); *H04N 13/007* (2013.01); *H04N 13/0011* (2013.01); *H04N 13/0404* (2013.01); *H04N 13/0422* (2013.01); *H04N 13/0445* (2013.01); *Y10T 29/49004* (2015.01)

(58) Field of Classification Search
CPC combination set(s) only.
See application file for complete search history.

(56) References Cited

U.S. PATENT DOCUMENTS

| 8,301,013 B2* | 10/2012 | Yamashita | ......... H04N 13/0029 348/51 |
| 2011/0157328 A1* | 6/2011 | Ishiyama | ............... G02B 27/22 348/51 |
| 2011/0298795 A1* | 12/2011 | Van Der Heijden et al. | ................... H04N 13/0011 345/419 |
| 2012/0069154 A1* | 3/2012 | Talstra | ............... H04N 13/0048 348/51 |

OTHER PUBLICATIONS

Papadimitriou D V et al: "Epipolar Line Estimation and Rectification for Stereo Image Pairs", IEEE Transactions on Image Processing, IEEE Service Center, Piscataway, NJ, US, Bd. 5, Nr. 4, Apr. 1, 1996, XP011025981, ISSN: 1057-7149, Zusammenfassung Seite 674, Spalte 1.

(Continued)

*Primary Examiner* — Barry Drennan
*Assistant Examiner* — Robert Craddock
(74) *Attorney, Agent, or Firm* — Bennett Jones LLP

(57) ABSTRACT

A method for visualizing three-dimensional images on a 3D display device, wherein an image to be visualized is supplied as an input image, is characterized in that at least one feature matrix is determined using the input image, the feature matrices defining light/dark information, and in that a display image for reproduction on the 3D display device is produced from the input image using said light/dark information. The invention further relates to a corresponding 3D display device.

3 Claims, 5 Drawing Sheets

(56) References Cited

OTHER PUBLICATIONS

Figure 1:
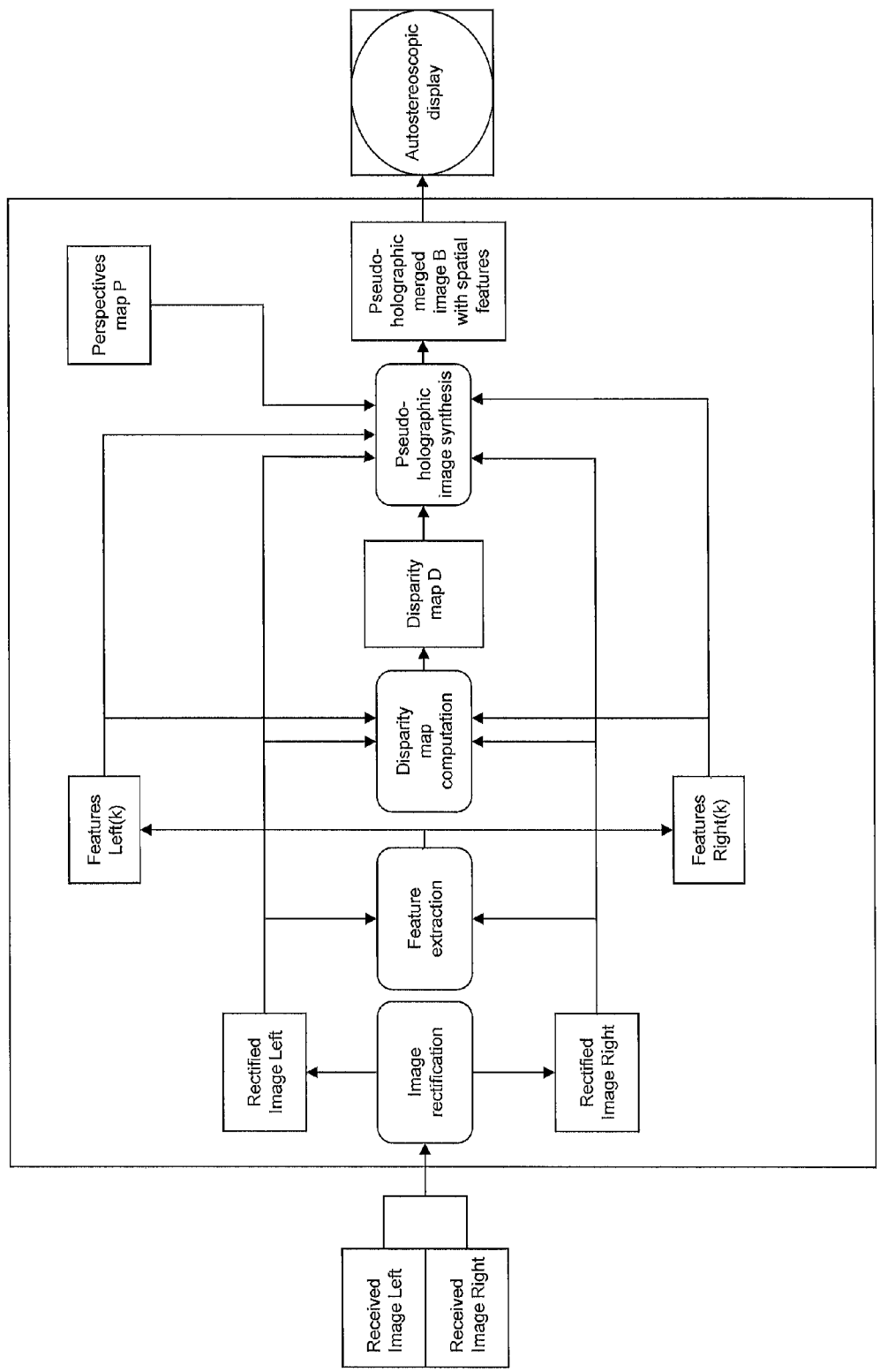

Kanopoulos N et al: "Design of an Image Edge Detection Filter Using the Sobel Operator", IEEE Journal of Solid-State Circuits, IEEE Service Center, Piscataway, NJ, USA, Bd. 23, Nr. 2, Apr. 1, 1988 (Apr. 1, 1998), Seiten 358-367, XP000001952, ISSN: 0018-9200, DOI:10.1109/4.996, Zusammenfassung.

Herbert Bay et al: "SURF: Speeded Up Robust Features", Jan. 1, 2006, Computer Vision—ECCV 2006 Lecture Notes in Computer Science;;LNCS, Springer, Berlin, DE, pp. 404-417, XP019036408, ISBN: 978-3-540-33832-1, Zusammenfassung.

* cited by examiner

METHOD FOR VISUALIZING THREE-DIMENSIONAL IMAGES ON A 3D DISPLAY DEVICE AND 3D DISPLAY DEVICE

The invention involves a method for the visualization of three-dimensional images on a 3D display device, to which an image to be visualized is fed as an input image. The invention also involves a 3D display device, in specific a stereoscopic or autostereoscopic display for visualizing three-dimensional images.

The method and 3D display devices of the type in question are known to have been in practical use for years. There are stereoscopic devices that allow viewing a three-dimensional image when using such visual aids i.e. as red and blue glasses, shutter glasses and polarization glasses.

There are also autostereoscopic visualization systems that enable one or more viewers positioned in front of an autostereoscopic display to view a three-dimensional image without the use of visual aids. Parallax barrier systems or lenticular lens systems set up in front of the display panel can be employed for this purpose, for example. Because one or more viewers may be positioned at different angles relative to a direction perpendicular to the display, more than two perspectives must always be generated and transmitted to the left and right eye respectively in order to achieve the most natural-looking three-dimensional image impression possible for all viewers wherever they are positioned. These systems are also known as multi-viewer or multi-view systems.

With the known 3D display devices it is problematic however that image presentation quality is unsatisfactory for the viewer.

The invention disclosed herewith intends to solve the problem of developing and evolving a method for visualizing three-dimensional images on a 3D display device, which improves the visualization of three-dimensional images with simple constructive means. Additionally, a corresponding 3D display device is to be disclosed.

The inventive task outlined above is solved by the features of Patent claim 1. Accordingly, the method concerned for the visualization of three-dimensional images on a 3D display device is characterized by defining at least one feature matrix that contains light/dark information generated from the input image, and an output image for viewing on the 3D display device being generated from the input image using the light/dark information.

Additionally, the task outlined above is solved by the features of Patent claim 17. Accordingly, the 3D display device in question, especially a stereoscopic or autostereoscopic display, for the visualization of three-dimensional images is characterized by the 3D display device having means defining at least one feature matrix that contains light/dark information using a fed input image, and by the means generating an output image for viewing on the 3D display device from the input image using the light/dark information.

The invention is based on the insight that it is of considerable advantage for the visualization of three-dimensional images to take account of the fact that the human eye has several times more light/dark receptors than it has color receptors. The invention is further based on the insight that it is of particular advantage to adapt the method and 3D display device to the anatomy of the eye and the subsequent information presentation. Specifically, at least one feature matrix defining light/dark information is determined using the input image. Using the light/dark information, an output image is generated from the input image for viewing on the 3D display device. Consequently, simple constructive means improve the visualization of three-dimensional images.

It is beneficial for the input image to contain two perspectives that correspond to a left and right subimage.

The subimages can be rectified for simple processing/editing, i.e. put in stereo normal form.

It is beneficial for the generation of a feature matrix to extract features via a feature extraction method from the input image or the subimages respectively.

The features may describe local characteristics. Local characteristics may for example be shapes, textures and/or edges.

In an advantageous embodiment, Sobel feature extraction can be used.

It is even more advantageous for the feature matrix to contain edge information. The human brain uses edges of objects to a significant degree for constructing the internal three-dimensional spatial image. Accordingly, edge information considerably reduces the work the viewer's brain has to perform, and improves adaptation to the anatomy of the eye and subsequent information processing in the brain.

Another advantageous embodiment option employs speed-up robust features (SURF) for feature extraction. For details concerning the SURF method see H. Bay, T. Tuytelaars and L. V. Gool, "SURF: Speeded Up Robust Features", Computer Vision and Image Understanding, 110 (3), 2008, pp. 346-359.

It is advantageous if the feature matrix includes information on distinctive image points.

It is additionally advantageous when a feature value is assigned to a pixel of a perspective of the input image as light/dark information via a feature matrix. Accordingly, feature values can be assigned to each pixel of a perspective of the input image as light/dark information.

In an advantageous embodiment, the feature value can be added to and/or multiplied with the subpixels of the corresponding pixel in the output image.

The feature value can be weighted with a scaling factor, in advantageous manner. In addition, the scaling factor can be interactively varied by means of a control unit, preferably a remote control unit.

Using a display device with RGB subpixels, the features of an edge operator used can be used to enhance the edges in the RGB subpixels. A pixel, consisting for example of RGB subpixels, can be adapted to the anatomy of the eye thus:

$$R^{new}(i,j) := R(i,j) + M(i,j,1) \cdot s,$$

$$G^{new}(i,j) := G(i,j) + M(i,j,1) \cdot s,$$

$$B^{new}(i,j) := B(i,j) + M(i,j,1) \cdot s,$$

where R(i,j), G(i,j) and B(i,j) define the respective colors red, green and blue. M(i,j,1) is the value for the edge operator or feature matrix with edge information for the pixel (i,j). s is a freely configurable scaling parameter. When controlled via a remote control unit, any viewer can configure the edge enhancement individually to suit his or her preference.

This process slightly enhances the color values of the stereo image at the edges slightly (without distorting the color) and makes them more easily recognizable for the light/dark receptors.

This allows integration of multiple features, thus:

$$R^{new}(i,j) := R(i,j) + s \cdot \Sigma M_l(i,j) \cdot s_l,$$

$$G^{new}(i,j) := G(i,j) + s \cdot \Sigma M_l(i,j) \cdot s_l,$$

$$B^{new}(i,j) := B(i,j) + s \cdot \Sigma M_l(i,j) \cdot s_l,$$

with the feature vectors M (i,j): =(M (i,j,1), ... , M (i,j,K)), where K is the number of different extracted features, and the weighting vector S:=$s_1, \ldots, s_K$) for every pixel (i,j). Such optical enhancement can of course be multiplicative.

Furthermore, in a particularly advantageous embodiment, the light/dark information can be displayed with additional supplementing light/dark subpixels in the display image. The light/dark subpixels can significantly improve the image viewer's spatial impression by displaying edge information.

For example, an autostereoscopic display could be characterized by a panel of subpixels and an optical element in front of it as the 3D display device. The subpixels can be color subpixels like RGB or CMY as well as light/dark subpixels. The color information of the subpixels of the perspectives can be displayed in the color subpixels. The light/dark subpixels can contain image features supporting the 3D impression as grey values, for example. This takes account of the fact that the human eye has appr. 110 million light/dark-receptors and only about 6.5 million color receptors. Because the human brain uses edges of objects to a substantial degree to construct the internal three-dimensional spatial image, edge information can be displayed via light/dark subpixels, so this image information is received via a much larger number of light/dark-receptors. This reduces the work the brain has to perform.

To improve the quality of the output image, the number of subpixels displayed can be significantly increased as well. A pseudo-holographic display can contain at least 10 to 20 times more subpixels for example than an input image fed as a stereo image. This larger number of subpixels makes it possible to represent a greater number of pixels per perspective from the multiple perspectives synthesized. High-definition images and videos of the current generation have about 1920×1080 pixels, with 5760 subpixels per line. At a tenfold increase and taking into account the subpixels that display feature information, a display can advantageously have at least 76,800×1080 subpixels. This takes into account that for autostereoscopic displays the assignment of perspectives occurs on a sub-pixel level. A bundling of subpixels to pixels is not relevant in such case.

In a concrete advantageous embodiment, a stereoscopic display or autostereoscopic display can be used as 3D display device.

In another advantageous embodiment, the input image can have a first and second perspective, the second being generated by displacement of the first perspective by a value of m>0. Thus in a first step, the 2D image fed can be used as a left subimage. The same 2D image however can be used as a right subimage shifted to the right by a value of m>0. In addition, the following type of disparity matrix can be generated:

$$D_{2D}'=\{m|i=1,\ldots,NZ; j=1,\ldots,NS\},$$

where NZ is the number of lines and NS the number of columns.

This results in all viewers having the impression that the 2D image (which is still perceived as such) is popping out from the display at a certain distance.

If the 2D image is shifted to the left by a certain value m<0, viewers get the impression that the image is popping into the display.

One could also let the viewer interactively choose the value m, using a remote control unit for example; the viewer could thus produce a "pop-out" or "pop-in" effect him/herself at any time.

It is advantageous for the 3D display device to have subpixels comprising the subpixels for representing a color in a predeterminable color system and light/dark subpixels for displaying feature information.

Additionally, the subpixels can be advantageously formed as separate elements.

The subpixels can have the same horizontal and vertical size, in an advantageous manner. It is particularly advantageous for the subpixels to be square in form, achieving greater resolution. The subpixels can also be round in shape. The standard requirement heretofore that all subpixels of a pixel must together form a square is thus eliminated. Instead, each subpixel is an independent element. Each of these subpixels has a color from the selected color system and the same horizontal and vertical size. With OLED or Nano-technology this is technically feasible without problem.

Figure 2:
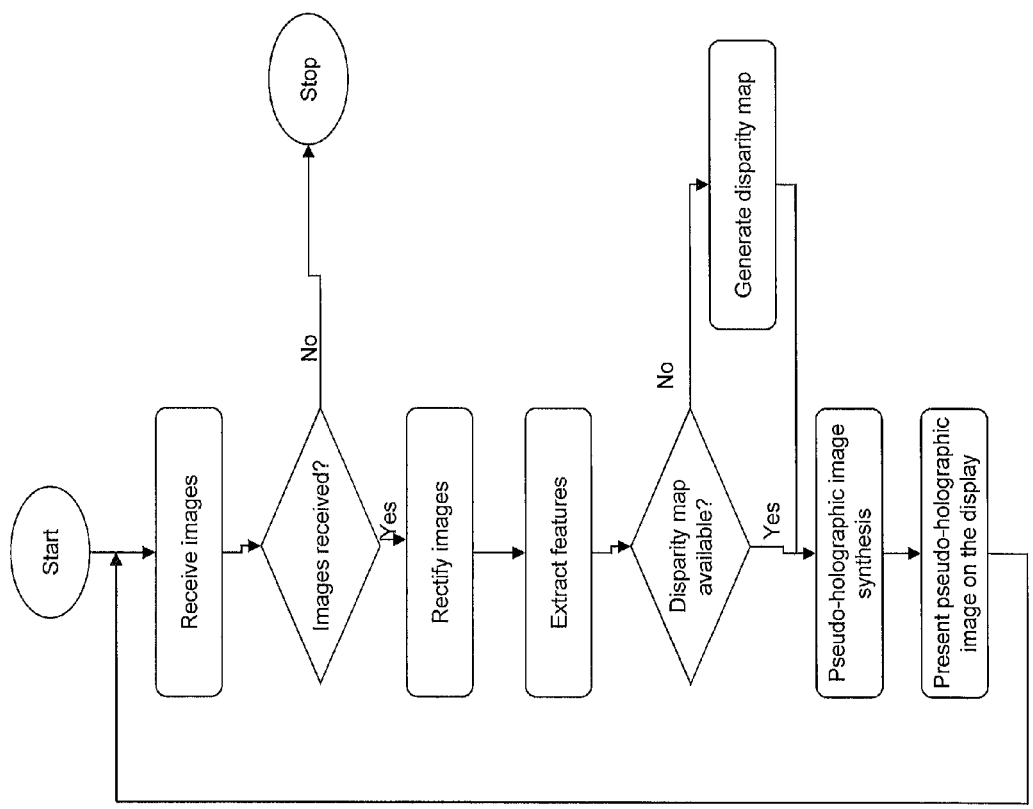
Figure 3:
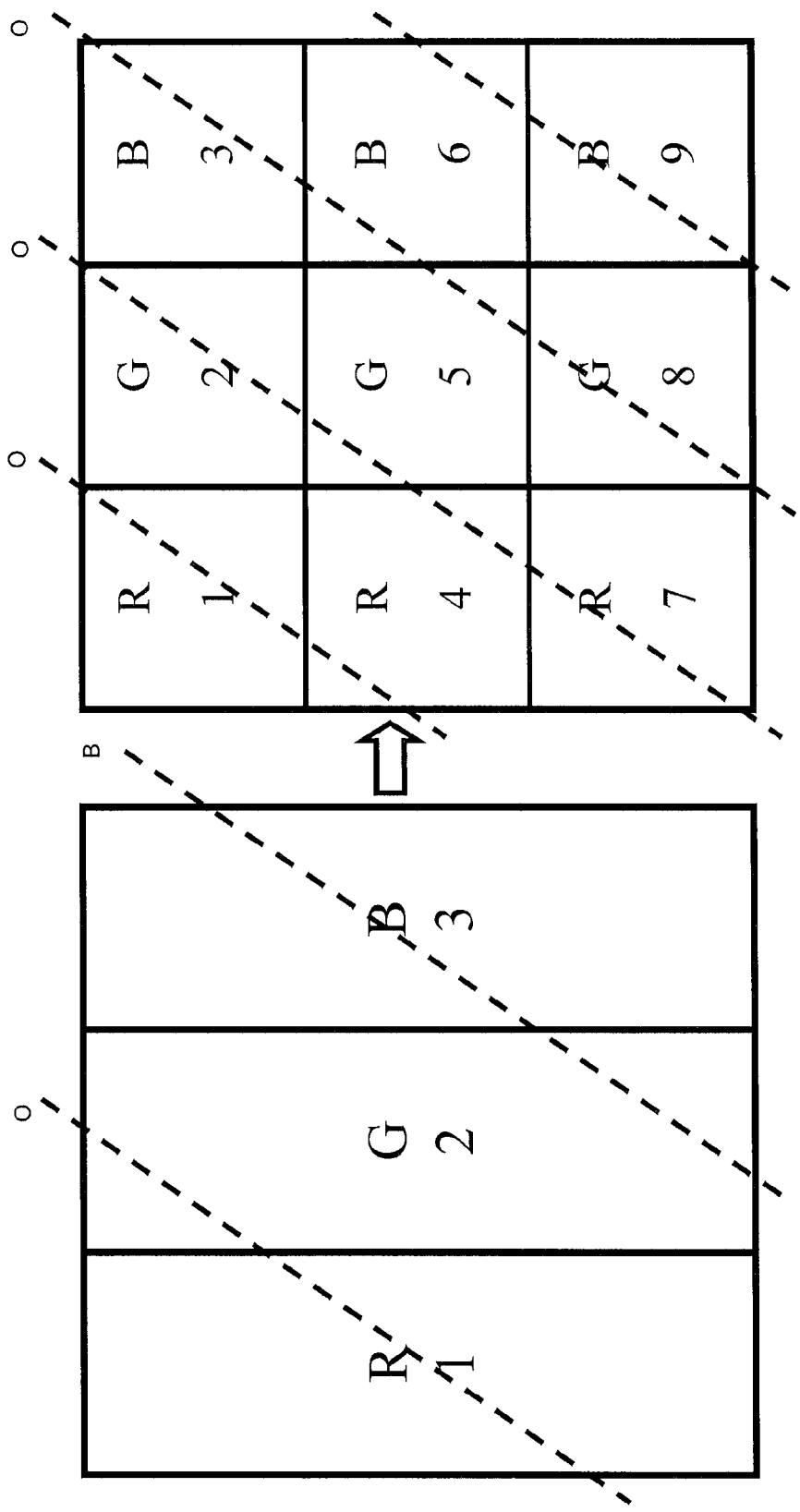
Figure 4:
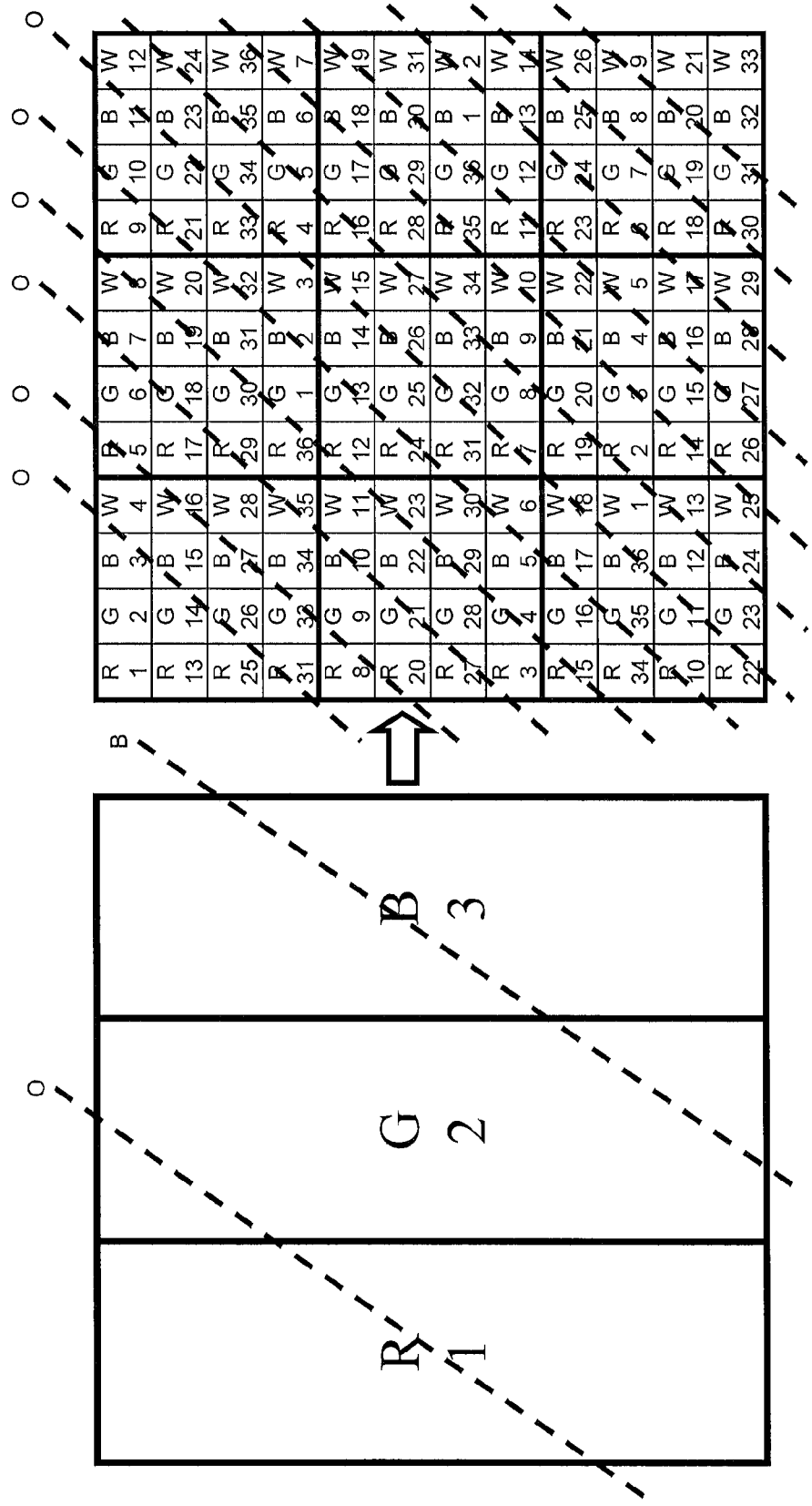
Figure 5:
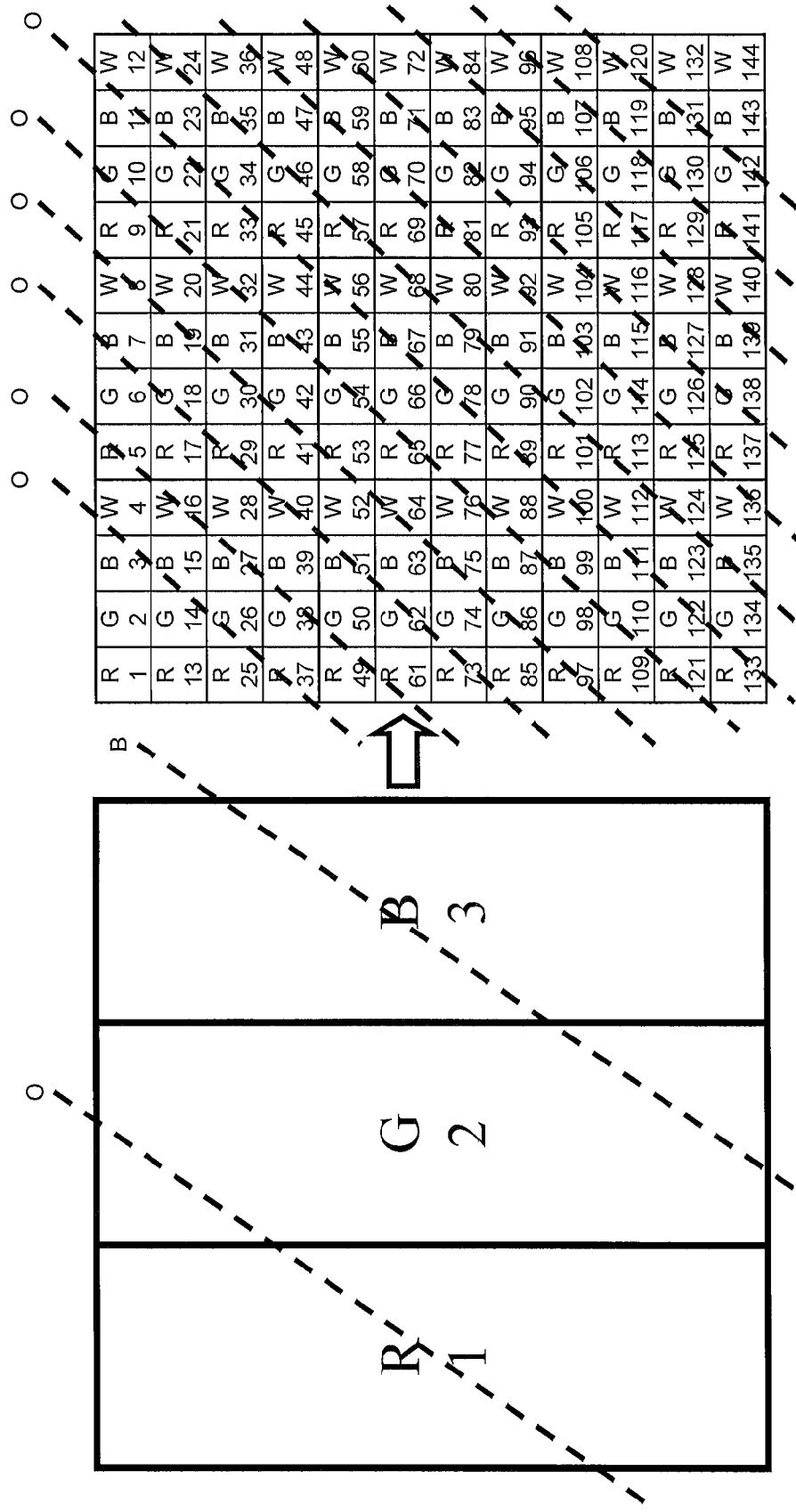

There are now a range of ways to embody and further improve the teaching of prior art of this invention in an advantageous manner. Reference is made accordingly to the sub-claims to Patent claims 1 and 17 and to the description below of a preferred embodiment for the invention as shown in the Figure. In conjunction with the description of the preferred embodiment of the invention as shown in the Figure, generally preferred embodiments and further improvements of the teaching of prior art are discussed as well. In the Figure, FIG. 1 shows a block diagram illustrating the overall system in one embodiment of the invention method and the invention 3D display device, FIG. 2 shows a flowchart of the overall system per FIG. 1, FIG. 3 shows a conventional sub-pixel layout in comparison to a new subpixel layout in an embodiment of a 3D display device per the invention, FIG. 4 shows a conventional subpixel layout in comparison to a new subpixel layout in another embodiment of a 3D display device per the invention, FIG. 5 shows the subpixel layout from FIG. 4, with a larger number of different perspectives being presented.

FIG. 1 shows a block diagram illustrating the overall system in a sample embodiment of the invention method and the invention 3D display device. The sample embodiment per FIG. 1 concerns a method for visualizing three-dimensional images on an autostereoscopic display as 3D display device, on which a multitude of perspectives, typically more than 100, are shown merged on the display out of a fed stereo image in any 3D format. The display consists of an optical element and an image generating unit. The multiple perspectives are generated in such a way that only those pixels of a perspective being generated have to be displayed. The image generating unit of the display consists of subpixels radiating a color, such as red, green or blue.

The autostereoscopic display is able to receive a 3D image or 3D image sequence in any format, such as stereo images or stereo image sequences. Other formats such as stereo images including a disparity map can be received and processed as well.

A received stereo image is first rectified, i.e., put in stereo normal form or into the standard epipolar configuration. If this is already the case, the identical transformation results.

Then, as per FIG. 1, various features such as edges and significant pixels (SURF) are identified in the two images $R_l$ and $R_r$. Various features can be extracted here. There is no special limitation. These features are used for both calculation of the disparity map, if necessary, and for visualization in certain additional subpixels.

If the disparity map was already received with the input image, the next step is skipped. Otherwise, the disparity map of the stereo image is calculated. This contains an assignment of the pixels from the left to the right subimages present in both received perspectives. The left and right occlusions will also be identified.

Any number of perspectives is then synthesized using the disparity map D of the received stereo image and the features. This procedure is such that only those subpixels are synthesized that actually have to be presented on the screen. As a result, for 100 perspectives to be displayed, only 1% of the subpixels are calculated from each perspective.

The information of which perspective is to be displayed on which subpixel is defined in the perspectives map P. The perspectives map is determined and saved during production of the display through a calibration process between subpixels and the optical system. Adjacent subpixels are generally assigned to different perspectives. Saving of the various subpixels from the different perspectives in the pseudo-holographic image B is called merging.

The autostereoscopic display is characterized by a panel of subpixels and an optical element in front of it. The subpixels are color subpixels such as RGB or CMY. The color information of the subpixels of the perspectives is displayed in the color subpixels.

To improve the quality of the image B, the number of subpixels displayed is substantially increased as well. A pseudo-holographic display per FIG. 1 has at least 10 to 20 times as many subpixels as are in the received stereo image. This larger number of subpixels allows representing a greater number of pixels per perspective from the multiple perspectives synthesized.

FIG. 2 shows a flowchart of the individual steps in the overall system per FIG. 1.

The steps per FIG. 1 and FIG. 2 are described in greater detail in the following. In the sample embodiment it is presumed that an image sequence of stereo images is received, decoded and provided in the memory areas $I_l$ and $I_r$ by a receiving module, i.e. via an antenna or the internet.

After reception the stereo image is enlarged or reduced to the resolution of the connected pseudo-holographic display. A display with a resolution of 19,200×10,800 pixels can be assumed to be high resolution. In this example case, a stereo HD image is enlarged ten times horizontally and vertically.

Rectification occurs as a first step. These methods are known from the literature. In the embodiment example per FIGS. 1 and 2, are in the left image $I_l$ nine significant pixels distributed uniformly over the image are searched for using the SURF method. The coordinate of each significant pixel is used as the center of a search block in the right-hand subimage $I_r$. In this search block, the most similar point is searched for in the right subimage $I_r$. The disparities of the nine significant pixels define a linear transformation matrix that rectifies each of the subimages $I_l$ and $I_r$ according to $R_l$ and $R_r$:

$$I_l \to Rl \text{ and } I_r \to R_r$$

This finalizes the rectification such that the epipolars now run parallel to the lines of the image and all subsequent operations can be performed line by line.

For calculation of features the SURF (Speeded Up Robust Features) or the Sobel edge detector methods can be used, for example.

SURF Feature Extraction:

This method is based on approximation of the determinant of the Hessian matrix for each pixel. The procedure is as follows.

In a matrix Isum generated for the left and right rectified subimages respectively, for each pixel the subtotals of the grey values of the lower image area are saved:

$$Isum(i, j) = \sum_{i_1=0}^{i} \sum_{j_1=0}^{j} I(i_1, j_1)$$

with $i := 1, \ldots NZ$ and $j := 1, \ldots NS$, where NZ is the number of lines and NS the number of columns.

The calculation proceeds by each line i first being assigned to a line processor i, which calculates the subtotal recursively, thus:

$$I\text{sum}_i(j):=I\text{sum}_i(j-1)+R_r(i,j)$$

for $i:=1, \ldots NZ$ and $j:=1, \ldots NS$
which is saved in Isum. Then each column j is assigned to a computing unit j which computes the column sum recursively, thus:

$$I\text{sum}(i,j):=I\text{sum}(j-1,j)+I\text{sum}_i(j)$$

for $i:=1, \ldots NZ$ and $j:=1, \ldots NS$.

The matrix thus computed now contains the desired subtotals for each subimage left and right. Now each line i is again assigned to a computing unit i (=line processor i), which first calculates the following intermediate values:

$$D_{xx}(i, j) := Isum(i-4, j-5) - Isum(i+2, j-5) +$$
$$Isum(i+2, j+4) - Isum(i-4, j+4) - 3 \cdot Isum(i+2, j+1) +$$
$$3 \cdot Isum(i+2, j-2) + 3 \cdot Isum(i-4, j+1) - 3 \cdot Isum(i-4, j-2)$$

$$D_{yy}(i, j) := Isum(i+4, j+2) - Isum(i+4, j-3) +$$
$$Isum(i-5, j+2) + Isum(i-5, j-3) - 3 \cdot Isum(i+1, j+2) +$$
$$3 \cdot Isum(i+1, j-3) + 3 \cdot Isum(i-2, j+2) - 3 \cdot Isum(i-2, j-3)$$

$$D_{RO}(i, j) := Isum(i+3, j+3) - Isum(i+3, j) - Isum(i, j+3) + Isum(i, j)$$

$$D_{LO}(i, j) :=$$
$$Isum(i+3, j-1) - Isum(i+3, j-4) - Isum(i, j-1) + Isum(i, j-4)$$

$$D_{LU}(i, j) := Isum(i-1, j-1) - Isum(i-1, j-4) -$$
$$Isum(i-4, j-1) + Isum(i-4, j-4)$$

$$D_{RU}(i, j) := Isum(i-1, j+3) - Isum(i-1, j) -$$
$$Isum(i-4, j+3) + Isum(i-4, j)$$

This yields $$D_{xy}(i,j):=D_{LO}(i,j)+D_{RU}(i,j)-D_{RO}(i,j)-D_{LU}(i,j)$$

The approximated determinant of the Hessian matrix is then saved for every pixel of the right subimage in the feature matrix $M_r(1)$:

$$M_r(i,j,1):=D_{xx}(i,j) \cdot D_{yy}(i,j)-0.81 \cdot D_{xy}(i,j) \cdot D_{xy}(i,j)$$

The same procedure is performed for every pixel of the left subimage $R_l$ and the result saved in the feature matrix $M_l(1)$. The feature matrices $M_r(1)$ and $M_l(1)$ thus result. For details see H. Bay, T. Tuytelaars and L. V. Gool, "SURF: Speeded Up Robust Features", Computer Vision and Image Understanding, 110 (3), 2008, pp. 346-359.

Sobel Feature Extraction:

The Sobel operator is only one of a large number of edge operators, and is thus described as an example.

An edge operator is of particular importance to the disparity map as it facilitates assigning a greater significance to edges than to smooth surfaces. Because an edge is always a local characteristic, this procedure allows taking into account the characteristics of local regions within a line as well.

The Sobel Prewitt operator works with 3×3 matrices for example, which detect edges in different directions. Distinction is made between horizontal, vertical, left and right diagonal edges. The following 3×3 matrices are used for their detection:

$$H_1 = \begin{bmatrix} -1 & 2 & -1 \\ -1 & 2 & -1 \\ -1 & 2 & -1 \end{bmatrix}$$

$$H_2 = \begin{bmatrix} -1 & -1 & -1 \\ 2 & 2 & 2 \\ -1 & -1 & -1 \end{bmatrix}$$

$$H_3 = \begin{bmatrix} -1 & -1 & 2 \\ -1 & 2 & -1 \\ 2 & -1 & -1 \end{bmatrix}$$

$$H_4 = \begin{bmatrix} 2 & -1 & -1 \\ -1 & 2 & -1 \\ -1 & -1 & 2 \end{bmatrix}$$

Implementation in an embodiment of the method per the invention is done by line i being assigned to a line processor i. For all lines i and columns j, the computing unit-local field edge(1) to edge(9) from the right-hand rectified subimage $R_r$ is filled as follows:

edge(1):=(i−1,j−1) edge(2):=(i−1,j)

edge(3):=$R_r$(i−1,j+1) edge(4):=$R_r$(i,j−1)

edge(5):=$R_r$(i,j) edge(6):=$R_r$(i,j+1)

edge(7):=$R_r$(i+1,j−1) edge(8):=$R_r$(i+1,j)

edge(9):=$R_r$(i+1,j+1)

for i:=1, . . . , NZ, and j:=1, . . . , NS

Each line processor i then calculates for each index j:

$H_1$ := 2·edge(2) + 2·edge(5) + 2·edge(8) − edge(1) − edge(4) − edge(7) − edge(3) − edge(6) − edge(9)

$H_2$ := 2·edge(4) + 2·edge(5) + 2·edge(6) − edge(1) − edge(2) − edge(3) − edge(7) − edge(8) − edge(9)

$H_3$ := 2·edge(7) + 2·edge(5) + 2·edge(3) − edge(1) − edge(2) − edge(4) − edge(8) − edge(9) − edge(6)

$H_4$ := 2·edge(1) + 2·edge(5) + 2·edge(9) − edge(2) − edge(3) − edge(6) − edge(4) − edge(7) − edge(8)

$M_r$(i,j,2) then results as $M_r$(i,j,2):=$H_1$+$H_2$+$H_3$+$H_4$ for i=1, . . . , NZ and j=1, . . . NS.

This procedure is carried out in the same manner for the left rectified subimage $R_l$. The feature matrices $M_r$(2) and $M_l$(2) thus result.

FIG. 3 shows a conventional pixel layout on the left with the three subpixels R (red), G (green) and B (blue). These subpixels serve the three perspectives 1, 2 and 3 using a lenticular lens as an optical element O. FIG. 3 shows a new subpixel layout on the right in which the independent subpixels form a square in an embodiment of the 3D display device as autostereoscopic display per the invention. Via the optical element O, 9 perspectives can be presented with 9 subpixels.

FIG. 4 shows a conventional pixel layout on the left. On the right, FIG. 4 shows another embodiment of a 3D display device as autostereoscopic display per the invention. A considerably finer and more detailed subpixel structure is generated there. Instead of three subpixels in a conventional pixel layout, in the subpixel layout of the embodiment, 144 subpixels are generated. The subpixels R (red), G (green) and B (blue) are supplemented by an additional subpixel W (e.g. white or yellow) to represent light/dark information. These 144 subpixels present 36 perspectives in the embodiment outlined.

FIG. 5 shows the subpixel layout from FIG. 4 in which the 144 individual, independent subpixels are used to present 144 perspectives.

In another embodiment of the method and 3D display device per the invention, the procedure for an autostereoscopic display can be as follows.

Two characteristics are factored in for adaptation to the anatomy of the human eye. These are
 1. the eye's resolution and
 2. the number and properties of the eye's receptors.

The resolution of the human eye generally ranges between 0.5' and 1.5'. Accordingly, most modern displays have a dot pitch of 0.2-0.3 mm. This means that from a distance of about 1 m, the pixels in the display are no longer visible. In the embodiment presented here of a 3D display device per the invention, the lens width of the lenticular grid used is approximately 0.2 mm. That means roughly 125 LPI (lenses per inch). The lens structure thus is no longer visible from a viewing distance of roughly 1 m. The number of subpixels behind a lens is on the order of 10 subpixels per lens. This means that the dot pitch of a pseudo-holographic display is roughly 0.06 mm. While conventional displays have 1920× 1080 pixels for example, (HDTV), the pseudo-holographic display presented here consists of a minimum 19200×1080 pixels.

The lenticular grid may consist of lenticular lenses or hexagonal lenses, with a diameter of 0.2 mm in this case.

The human eye has roughly 6.5 million color receptors and 100 million light/dark-receptors, i.e. about 15 times as many light/dark-receptors as color receptors. Furthermore, the human brain heavily uses edge information for generating the internal spatial image. Edges provide information about the foreground/background relationships of objects via the right and left occlusions they exhibit.

Thus in an embodiment, it is particularly advantageous for the known subpixels RGB or YMC to be supplemented by light/dark subpixels that show the edge information generated in the feature extraction phase by the edge operators.

Homogeneous areas have no edges. Light/dark subpixels within such areas in the image do not represent information.

Edges are shown brighter in the light/dark subpixels according to the intensity of the detected edge. This highlights the edges in the image, making them more easily detectable by the 100 million light/dark-receptors.

This makes it easier for the brain to generate the internal spatial image. The human brain recognizes patterns on homogeneous areas as such due to the learning effect, so these do not affect the spatial image impression.

The geometric arrangement of light/dark subpixels can be varied per the invention. FIGS. 3, 4 and 5 show different arrangements. Other features for spatial image generation may be added alongside light/dark subpixels to improve edge detection. These include, but not exclusively, the SURF operator.

The breakdown of pixels into the color subpixels (generally RGB subpixels) is also eliminated. Because the assignment of perspectives for an autostereoscopic display always occurs on the level of subpixels with color and light/dark subpixels, the grouping of subpixels into pixels is abandoned in the display described here. Every color and light/dark subpixel is a separate light-emitting element to which a particular perspective is assigned, and has the same horizontal and vertical size. This is shown on the right-hand side of FIGS. 3, 4 and 5. Backwards compatibility is still ensured, so all 2D images and videos can be displayed without any problem. OLED technology allows manufacturing of such an autostereoscopic display.

Please refer to the general section of the description and the attached Claims regarding further advantageous embodiments of the method and display device per the invention.

Explicit advisory is given that the embodiments described above of the method and device per the invention solely serve the purpose of discussing the teaching of prior art employed, and are not the only embodiments.

The invention claimed is:

1. A computer-implemented method, utilizing a processor, implemented at least in part in hardware, and configured for the visualization of three-dimensional images, wherein the color values of pixels of the three-dimensional images are modified in order to present additional information and optimize the information for the anatomy of a human eye, on a 3D display device, to which an image to be visualized is outputted by the processor as an input image, said method comprising the steps of:

extracting a feature matrix m(i,j,1) from the input image, wherein said feature matrix describes edges of objects;

for each pixel on the 3D display device, assigning a matrix element of said feature matrix M(i,j,1) comprising light and dark information;

wherein each pixel of the 3D display device comprises a red (R) subpixel, a green (G) subpixel and a blue (B) subpixel, and adapting each pixel of the 3D display device for viewing by the human eye according operations $R^{new}(i,j)$, $G^{new}(i,j)$ and $B^{new}(i,j)$ comprising, $R^{new}(i,j):=R(i,j)+M(i,j,1)*s,$ $G^{new}(i,j):=G(i,j)+M(i,j,1)*s,$ $B^{new}(i,j):=B(i,j)+M(i,j,1)*s,$ and wherein,
R(i,j), G(i,j) and B(i,j) define the RGB colors of corresponding pixels of the input image,
$R^{new}(i,j)$, $G^{new}(i,j)$ and $B^{new}(i,j)$ define the new colors of the corresponding pixels of the image to be visualized,
M(i,j,1) is the feature value of the pixel (i,j), which has been assigned in the previous step to the pixel (i,j), and wherein s is a freely configurable scaling factor, and s>0.

2. The computer-implemented method as claimed in claim 1, wherein said scaling factor is variable in response to a viewer based on her viewing preferences.

3. The computer-implemented method as claimed in claim 1, wherein the input image comprises a first and second perspective, said second perspective being generated by displacing said first perspective so that the image appears to project out from the 3D display device at a certain distance.

* * * * *